United States Patent
Kalyanaraman et al.

(10) Patent No.: US 11,059,333 B2
(45) Date of Patent: Jul. 13, 2021

(54) SYSTEM FOR TIRE PERFORMANCE ALERTS AND ASSISTED REMEDIATION

(71) Applicant: ExxonMobil Research and Engineering Company, Annandale, NJ (US)

(72) Inventors: Mohan Kalyanaraman, Media, PA (US); Adam G. Stern, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 17/047,917

(22) PCT Filed: Feb. 21, 2019

(86) PCT No.: PCT/US2019/018864
§ 371 (c)(1),
(2) Date: Oct. 15, 2020

(87) PCT Pub. No.: WO2019/199380
PCT Pub. Date: Oct. 17, 2019

(65) Prior Publication Data
US 2021/0107324 A1   Apr. 15, 2021

Related U.S. Application Data

(60) Provisional application No. 62/656,409, filed on Apr. 12, 2018.

(51) Int. Cl.
*B60C 23/04* (2006.01)
*G07C 5/00* (2006.01)

(52) U.S. Cl.
CPC ...... *B60C 23/0479* (2013.01); *B60C 23/0401* (2013.01); *B60G 2400/52* (2013.01); *B60G 2800/984* (2013.01); *G07C 5/008* (2013.01)

(58) Field of Classification Search
CPC ........... B60C 23/0479; B60C 23/0401; B60G 2800/984; B60G 2400/52; G07C 5/008
(Continued)

(56) References Cited

U.S. PATENT DOCUMENTS 5,557,268 A     9/1996  Hughes et al.
6,441,732 B1 *  8/2002  Laitsaari ............. B60C 23/0401
                                                       340/438

(Continued)

*Primary Examiner* — Eric Blount
(74) *Attorney, Agent, or Firm* — Anthony G. Boone

(57) ABSTRACT

In various aspects, the performance optimization system described herein optimizes vehicle performance through smart alerts communicated to an operator, owner, or fleet manager of a vehicle. When a vehicle characteristic is outside of the target range, a smart alert can be communicated to the user to encourage the user to bring the vehicle characteristic back into a target range. Aspects of the performance optimization system can focus on tire characteristics, which are one type of vehicle characteristic. Exemplary tire characteristics can include tire pressure, tire tread, and tire alignment. In order to generate smart alerts, vehicle information can be gathered from a variety of sources. In particular, information about a tire can be collected from an onboard tire pressure monitoring system, tire mats, or other mechanisms. This information can be analyzed to determine whether vehicle characteristics are inside or outside of a target range for the particular characteristic. When outside the target range, a smart alert is generated.

20 Claims, 9 Drawing Sheets

(58) Field of Classification Search
USPC .......................... 340/442–443; 73/146–146.8
See application file for complete search history.

(56) References Cited

U.S. PATENT DOCUMENTS

| | | | |
|---|---|---|---|
| 6,823,728 B1 * | 11/2004 | Barnes | G01L 17/005 |
| | | | 73/146 |
| 8,312,766 B2 | 11/2012 | Pingel | |
| 8,525,657 B2 * | 9/2013 | Patel | B60C 23/0406 |
| | | | 340/447 |
| 2016/0232565 A1 | 8/2016 | Goergen | |

* cited by examiner

SYSTEM FOR TIRE PERFORMANCE ALERTS AND ASSISTED REMEDIATION

CROSS-REFERENCE TO RELATED APPLICATIONS

This application is a National Phase Application claiming priority to PCT Application Serial No. PCT/US2019/018864 filed Feb. 21, 2019, which claims the benefit of Provisional Application No. 62/656,409, filed Apr. 12, 2018, the disclosures of which are incorporated herein by reference.

FIELD

Methods for dynamically measuring and optimizing automotive tire characteristics, calculating changes in automotive performance using the tire characteristics, generating alerts and tire performance remedies to drivers and networks, are provided.

BACKGROUND

The performance of an automobile can change significantly as tire characteristics change. For example, low tire pressure (i.e., below an OEMs recommended pressure) decreases fuel efficiency, increases braking distance, and can decrease handling performance. Low tire pressure can also decrease tread life. As treads are worn off, automobile performance, especially braking and handling decreases. Many drivers do not understand the relationship between tire pressure, tread life, and performance. As a result, drivers do not monitor tire pressure or tread, but rely on automated systems or mechanics to identify problems.

Many vehicles are capable of providing a tire pressure alert to a user through a dashboard warning light or some other mechanism. The tire pressure in each tire can be read by an onboard tire pressure monitoring system. Typically, the warning light only comes on when the tire pressure falls a significant amount, such as 20% or more. More recently, vehicles are able to display the actual tire pressure reading in each tire on a graphical user interface or through some other method. Again, the tire pressure reading is typically presented only when a threshold is reached. The user may be able to navigate to a view that shows the tire pressure readings.

U.S. Patent Publication No. 2016/232,565 uses tire pressure readings to target users with advertisements. The advertisements may be communicated through an in-vehicle communication system or through a user device, such as a smart phone.

SUMMARY

In various aspects, the performance optimization system described herein optimizes vehicle performance through smart alerts communicated to an operator or fleet manager of a vehicle. The performance optimization system can help keep a vehicle's characteristics within a target range. When a vehicle characteristic is outside of the target range, a smart alert can be communicated to the user to encourage the user to bring the vehicle characteristic back into a target range. Aspects of the performance optimization system can focus on tire characteristics, which are one type of vehicle characteristic. Exemplary tire characteristics can include tire pressure, tire tread, and tire alignment.

A smart alert can take the form of a performance alert or a comparative alert. A performance alert includes content that explains how a currently measured vehicle characteristic decreases a vehicle's performance. For example, a performance alert could communicate that a car's current tire pressure reduces the car's gas mileage by five percent compared to when the tires are inflated to the manufacturer's recommended pressure. Another alert could communicate that the current condition one or more tires would fail inspection from a relevant government body.

A comparative alert includes content that compares a characteristic of a vehicle to the characteristic of another group of vehicles. In one aspect, the group of vehicles belong to people having relationships within a network, such as a social network. People can opt in to a comparative program that allows vehicle information to be aggregated and used to form the comparative alerts. An exemplary comparative alert could state that a user is in the bottom 10% of group members in terms of achieving optimal gas mileage through correct tire pressure.

Smart alerts can be tailored to an individual user as user responses to different alert content are measured. The timing and electronic device chosen to present the smart alert can similarly be customized to users. For example, a gas pump may be the best way to communicate a smart alert to the general population, but some users may respond better to a message communicated through a vehicle communication system or a smart phone. Similarly, many users may respond to a smart alert while at a location where remedial action can be taken, such as a service station. However, other users may better respond when a smart alert is communicated during the morning when he or she is planning his or her day. The means of communication can also be optimized to a user preference. For example, some users may respond better to alerts communicated via e-mail or in real time via mobile or web application. The smart alerts can be communicated to a fleet manager interested in visualizing data on many vehicles at once In this way, the timing of a smart alert can be optimized and/or tailored for individual users.

In order to generate smart alerts, vehicle information needs to be gathered. In particular, information about a tire can be collected from an onboard tire pressure monitoring system, tire mats, or other mechanisms. This information can be analyzed to determine whether vehicle characteristics are inside or outside of a target range for the particular characteristic, or how far from an ideal state across a range, for a single vehicle or a large fleet. When outside the target range, a smart alert is generated.

DETAILED DESCRIPTION

Overview

Figure 1:
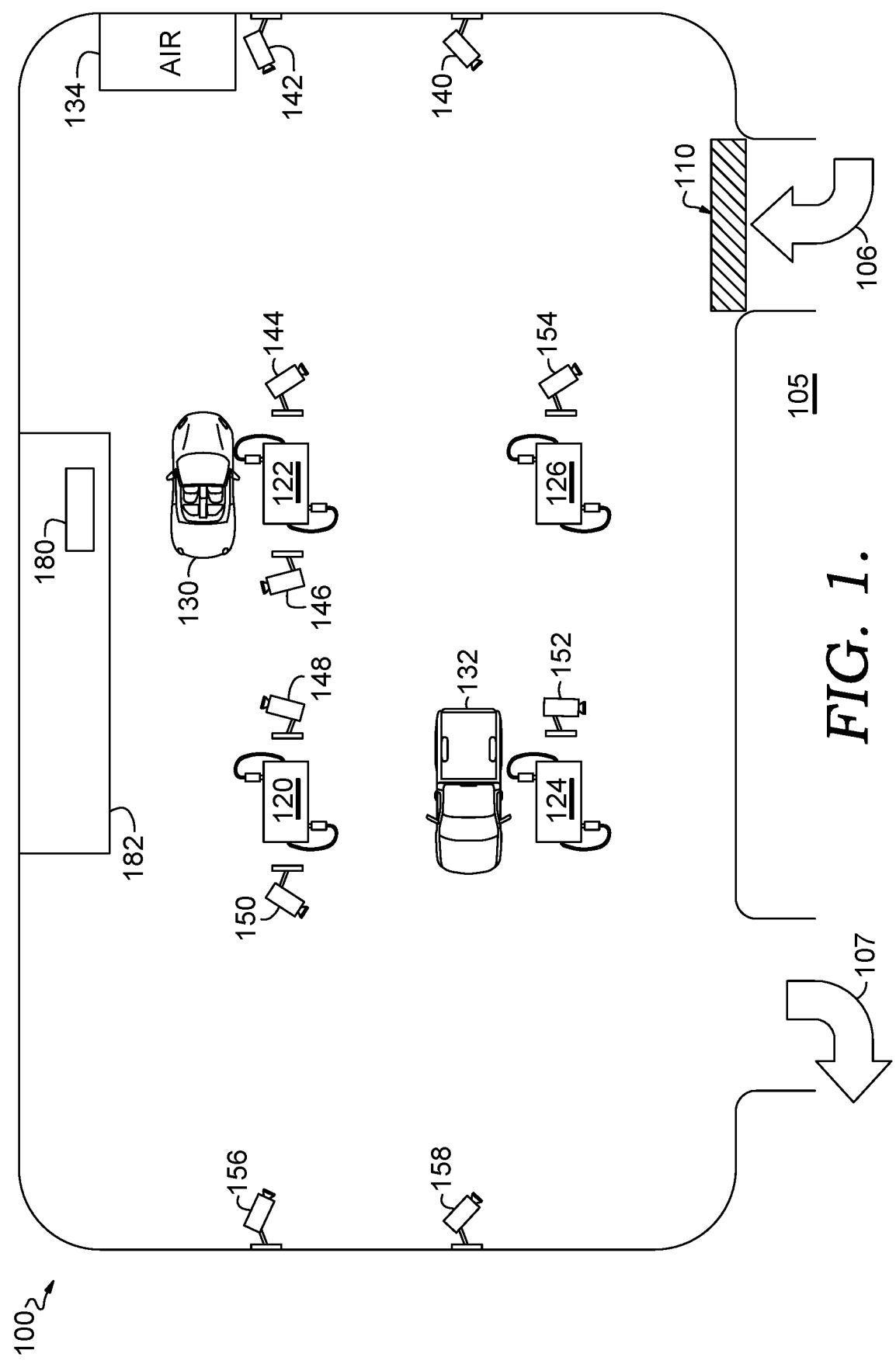
FIG. 1 shows a gas station with an integrated tire monitor, car tracking system, performance alert systems, and a smart tire inflation system.

Aspects of the performance optimization system described herein optimize vehicle performance through smart alerts communicated to an operator, fleet manager, or owner of a vehicle. The performance optimization system can help individual drivers keep a vehicle's characteristics within a target range. When a vehicle characteristic is outside of the target range, a smart alert can be communicated to the user to encourage the user to bring the vehicle characteristic back into a target range. Aspects of the performance optimization system can focus on tire characteristics, which are one type of vehicle characteristics. Exemplary tire characteristics can include tire pressure, tire tread, and tire alignment.

A smart alert can take the form of a performance alert or a comparative alert. A performance alert includes content that explains how a currently measured vehicle characteristic decreases a vehicle's performance. For example, a performance alert could communicate that a car's current tire pressure will reduce the car's gas mileage by five percent compared to when the tires are inflated to the manufacturer's recommended pressure. An alert that only communicates a measured vehicle characteristic without also communicating how the vehicle characteristic influences of vehicle performance is not a performance alert for purposes of the present application.

A comparative alert includes content that compares a characteristic of a vehicle to the characteristic of another group of vehicles. In one aspect, the group of vehicles are those of people having relationships within a social network. People could opt in to a comparative program that allows vehicle information to be aggregated and used to form the comparative alerts. Other methods of forming a group are possible. A company with many work vehicles (e.g. a vehicle fleet) could utilize the system to improve tire maintenance and fuel efficiency across the fleet. As part of a green incentive program, companies could encourage employees to form a group that shares vehicle information. The goal is to incentivize drivers and networks to keep their vehicles in optimal driving condition to reduce gas usage and decrease the possibility of accidents that could result from non-optimal breaking or handling. Similarly, families could opt into a program that allows vehicle information to be shared and used to generate comparative alerts. An exemplary comparative alert could state that a user is in the bottom 10% of group members in terms of achieving optimal gas mileage through correct tire pressure.

A single smart alert could combine both a performance alert and a comparative alert into a single alert. The content, timing, and communication device used to communicate a smart alert can be optimized and/or modified on a user-by-user basis through machine learning. Initially default content can be selected for a smart alert based on crowd source data that identifies general trends. Once information for an individual user is collected, the default content can be changed to a content that is more effective for the individual user. For example, the crowd-sourced data may determine that performance alerts presenting opportunities for improved gas mileage are the most effective content, in general. A message can be deemed effective when a desired result is achieved in response to the message, for example, by inflating tires or replacing worn tires. The default message content can be selected based on all data gathered or based on demographic characteristics of different users when trends are identified. For example, it may be observed that teenagers respond better to comparative alerts or performance alerts based on braking distance, than to messages based on improved gas mileage. In this case, the most effective messages for teenagers could become the default for teenagers.

Smart alerts can be tailored to an individual user as user responses to different alert content or types are measured. It should be noted that a certain number of smart alert opportunities could be designated for experimentation, which involves presenting an alert that is not currently calculated as being the most effective. This allows additional data to be gathered and improved optimization of content and alert type on a user-by-user basis.

The timing and electronic device chosen to present the smart alert can similarly be customized to users. For example, a gas pump may be the best way to communicate a smart alert to the general population, but some users may respond better to a message communicated through a vehicle communication system or a smart phone. Similarly, many users may respond to a smart alert while at a location where remedial action can be taken, such as a service station. However, other users may better respond when a smart alert is communicated during the morning when he or she is planning his or her day. In this way, the timing of a smart alert can be optimized for individual users.

In order to generate smart alerts, vehicle information can be gathered from a variety of sources. In particular, information about a tire can be collected from an onboard tire pressure monitoring system, tire mats, or other mechanisms. This information can be analyzed to determine whether vehicle characteristics are inside or outside of a target range for the particular characteristic. When outside the target range, a smart alert is generated.

The smart alerts can include information that facilitates the user correcting the performance characteristic. For example, a smart alert and point out a nearby air station, mechanic, or other mechanism for fixing the performance characteristic.

Vehicle Characteristic: As used herein, a vehicle characteristic is any characteristic that can be directly measured by a sensor (e.g., a camera or tire mat). Tire pressure, tire tread, and tire alignment are examples of vehicle characteristics.

Vehicle Performance Characteristic: As used herein, a vehicle performance characteristic is an estimate of performance calculated using, in part, vehicle characteristics. Gas mileage, braking distance, handling, and other performance characteristics can be estimated using tire pressure, tread life, and other characteristics of a vehicle, the environment, or other factors. The vehicle performance estimate can be expressed as deviation from a baseline performance. For example, the vehicle performance estimate can be expressed as a percentage decrease in performance.

Driving context: The driving context includes variables apart from the vehicle that can influence a vehicle performance estimate. Example driving contexts can include current road conditions, current or forecast weather, and current traffic.

"Contextual signals," as utilized herein, may reflect any attribute of a user (for instance, physical characteristics), the user's historical interaction with the system (e.g., vehicle maintenance, alerts received, responses to alerts, and system other interaction patterns), and/or the user's recent interaction with the system (with "recency" being defined in accordance with a predetermined time frame relative to a given point in time) that may affect the likelihood or probability that the user desires to engage in a particular activity. Such contextual signals may include, by way of example only and not limitation, the location of the user of a vehicle (determined utilizing, for instance, Global Positioning System (GPS) signals, Internet Protocol (IP) address, or the like), the time of day (either general (for instance, morning or afternoon) or exact (for instance, 6:00 pm)), the date (either exact or generally a particular month, season, etc.), a physical characteristic of the user (for instance, if the user is paralyzed and capable of only voice input, or the like), a task currently engaged in by the user, a task recently engaged in by the user (again with "recency" being defined in accordance with a predetermined time frame relative to a given point in time), an object the user is currently engaged with (e.g., a gas pump, an object the user was recently engaged with or is engaged with on the computing device, a function currently being performed by the user, a function recently performed by the user, hardware currently being utilized on the computing device, hardware recently utilized on the computing device, software currently being utilized on the computing device, and software recently utilized on the computing device.

Turning now to FIG. 1, a performance optimization system integrated with a service station 100 is shown, in accordance with aspects of the technology described herein. The performance optimization system includes a performance optimization hub 180 communicatively coupled to sensors that provide data, communication devices, and maintenance devices that can optimize vehicle performance. The performance optimization hub 180 can comprise a computing device, such as computing device 900 described with reference to FIG. 9, programmed with computer code, that when executed performs tasks that help optimize vehicle performance. The performance optimization hub 180 can communicate with centralized optimization server (not shown) via a computer network. The centralized optimization server can provide information about specific users, vehicles, tires, and other systems. This information can then be used by the hub 180 to generate smart alerts that provide information to users about their vehicles and the impact of action or lack of action may have on vehicle performance. Alternatively, the centralized optimization server can provide alerts directly to the users or generate alerts that are communicated to users via the systems controlled by the hub 180, such as the gas pumps (e.g., a pump 120). For the sake of readability, actions will often be described as performed by the performance optimization system, but it should be understood that any performance optimization action described herein could be performed by the hub 180 alone, by the centralized server alone, or through cooperation between these and other components shown or not shown. In one aspect, the performance optimization hub 180 is virtual and its functions are implemented by code running in a data center. In other words, in some implementations a physical hub 180 device is not present at the service station 100. In the virtual hub implementation, the various devices at service station 100 (e.g., smart air station, pumps, sensors, tire mat) communicate with the virtual hub over a wide area network. For example, the devices may communicate with a local WI-FI router connected to the wide area network to communicate with the virtual hub running in a data center.

The performance optimization system uses data received from image sensors, vehicles, user devices, and other sources to identify and track vehicles, measure vehicle characteristics, assess vehicle performance using the characteristics, generate smart alerts, communicate the smart alerts to users, and control the smart air station 134. The hub 180 can be located inside a service station building 182. As mentioned, the performance optimization hub 180 can communicate with a centralized performance optimization server (not shown) that can in turn communicate with vehicles directly, user devices such as smart phones and laptops, vehicle automation systems, fleet management systems, and other components. Together, the hub 180, server, and other components can be described as a performance optimization system.

In an aspect, a tire reading can be calculated for each tire in a vehicle as a vehicle dries over a tire mat 110. Image sensors can be used to track vehicle movements throughout the station 100. When low air pressure or tread is detected in one or more of a vehicle's tires, a smart alert can be communicated to the user through a monitor and/or speakers integrated with a gas pump, through a user device (e.g., smart phone), through a vehicle information system, or some other mechanism. The user then may choose to add air to the one or more tires at the smart air station 134. The image sensors can track a car's movement from a pump to the smart air station 134. The performance optimization system can automatically instruct the smart air station 134 to fill the tires to recommended manufacturer pressurization.

In one aspect, a user can pay for use of the smart air station 134 through a credit card reader on the pump as part of a gas payment or through a payment application on a user device. If an application is used, an appropriate payment message can be communicated to the user device.

In the example shown in FIG. 1, the service station 100 includes four gas pumps (gas pump 120, gas pump 122, gas pump 124, and gas pump 126) capable of serving gas to different vehicles simultaneously. In addition to serving gasoline to a vehicle, the pumps can include a digital display screen and speakers to communicate with a driver. Initially, two vehicles are shown. Vehicle 130 is located adjacent to the pump 122 and vehicle 132 is located adjacent to the pump 124. Vehicles enter the service station 100 from road 105 through entrance 106 and can depart from the service station 100 onto the road 105 through exit 107.

The service station 100 comprises a group of image sensors, which may take the form of video cameras and/or depth cameras. Depth cameras can take the form of time-of-flight, structured light, stereoscopic, and such. Any type of depth camera can be used with aspects of the technology described herein. The depth images produced by these cameras can be used to locate a vehicle within the service station, for example, through object recognition. The depth image may comprise a number of pixels with a depth value for each pixel. The depth value for each pixel corresponds with a distance between a point on an object in the area being viewed by the depth camera and a reference position.

A time-of-flight camera may be a phase modulation time-of-flight camera. It comprises a light emitter and an image sensor. The light emitter outputs modulated light. In an example, the source of modulated light may be an incoherent light source, which emits transmitted light that is modulated with a signal at a modulation frequency. In an example, the light from the device may be modulated rapidly, such that the amount of illumination changes periodically.

In a phase modulation system, the light emitter can output light at multiple modulation frequencies. The light emitter may be selected so that the wavelength of the emitted light is the most appropriate wavelength for a particular application, such as a service station. In an aspect, the light source may be selected to be a source of light of an appropriate wavelength for the application for which it is intended.

The light source may illuminate an object within the field of the camera, such as a group of gas stations and/or a smart tire station, and at least some of the light is reflected back toward the camera from the object(s). The reflected light may be detected by the image sensor. The reflected light is also modulated and the reflected light may be out of phase with the transmitted light due to the delay caused by the distance the light has travelled on the return trip between the sensor and the object. For each pixel of the image sensor, the amplitude and phase difference of the received signal relative to the transmitted light may be determined for each modulation frequency and used to calculate a depth for the pixel.

A structured light image corresponds to an image derived in part from use of a structured light source. A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). A depth map can be determined based on a structured light image by, for example, triangulation. One option for triangulation can be to have at least two cameras with overlapping fields of view for detecting the structured light image with known distance relationships between the at least two cameras. Another option can be to have a known distance relationship between the structured light source and a single camera for capturing the structured light image. In this type of option, the known offset between the structured light source and the camera can be used in combination with a predetermined reference pattern projected by the structured light source to allow the light source to be used as a "virtual camera" for purposes of triangulation.

The image sensors include image sensor 140 directed towards the entrance 106 and image sensor 158 directed towards the exit 107. Image sensor 142 and capture the area around the smart air station 134. The image sensor 156 can capture a general view of the pumps. Each pump is also associated with an image sensor. Gas pump 120 is associated with image sensor 148 and image sensor 150. Gas pump 122 is associated with image sensor 146 and image sensor 144. Gas pump 124 is associated with image sensor 152 and gas pump 126 is associated with image sensor 154. Aspects of the technology can use data from the image sensors to identify and track vehicles as they move throughout the service station 100. For example, image sensor 140 could identify a car driving over the tire mat 110 and then the other image sensors to track its movement to a pump or the smart air station 134. Tracking vehicle locations throughout a service station is described in U.S. Pat. No. 5,557,268, entitled, "Automatic vehicle recognition and customer automobile diagnostic system," the entirety of which is hereby incorporated by reference.

The tire mat takes sensor readings as the vehicle drives over the mat. The sensor readings can be used to calculate a tire pressure, tread depth, uneven wear patterns indicating an alignment problem and other tire characteristics. The tire mat can also use the sensor readings to identify a tire model through tread analysis and comparison. A tire mat suitable for installation at a service station and take tire pressure readings is described in U.S. Pat. No. 5,557,268, entitled, "Automatic vehicle recognition and customer automobile diagnostic system," the entirety of which is hereby incorporated by reference. In one aspect, a tire mat weighs the vehicle and is then able to determine the tire pressure by analysis of a footprint created by the tire on the sensor. Another tire mat is described in U.S. Pat. No. 8,312,766, entitled "Method for ascertaining the pressure and the profile depth in a vehicle tire," the entirety of which is hereby incorporated by reference.

Figure 2:
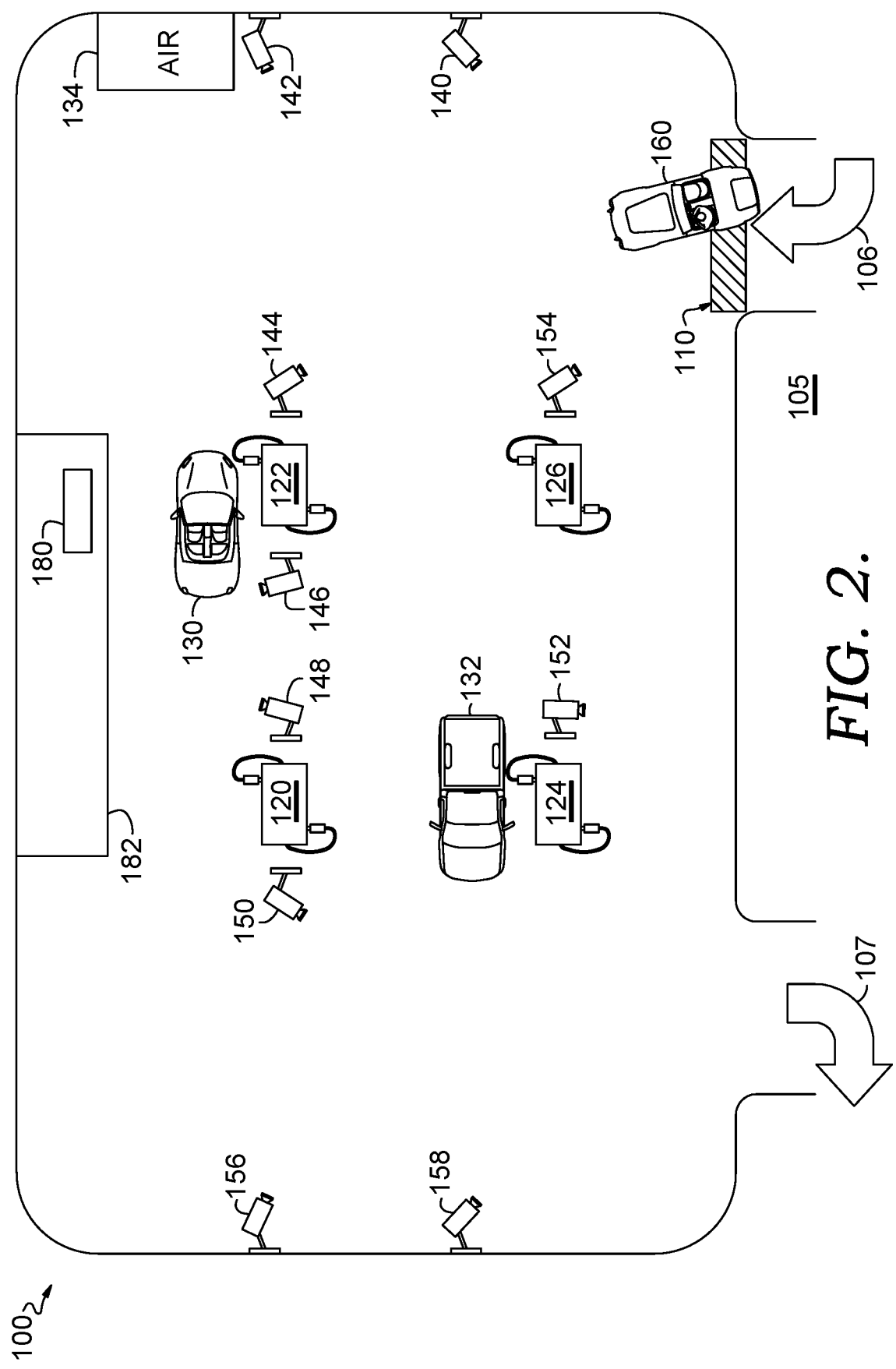
FIG. 2 shows a car driving over the integrated tire monitor.

Turning now to FIG. 2, the measuring of tire characteristics as a vehicle 160 drives over the tire mat 110 is illustrated, in accordance with an aspect of the technology described herein. As can be seen, vehicle 160 drives over the tire mat 110 as it goes through the entrance 106 driveway into the service station 100. The sensor data collected is then communicated to the performance optimization system via a wired or wireless connection. It should be noted that an onboard tire pressure monitoring system can provide tire pressure information to the performance optimization system. The information provided by the tire pressure monitoring system can be in addition to or instead of data gathered by a tire mat 110.

The tire mat data is analyzed by the performance optimization system to determine whether an alert is appropriate. If the tire pressure and/or other tire characteristics measured by the sensors, such as tread life and/or alignment, are within recommended ranges then no alert needs to be generated. However, a communication may optionally be generated indicating that measurements have been taken and that the vehicle characteristics appear to be within optimal operating ranges. For example, specific tire pressures measured could be shared on a graphical user interface at the pump that also show the manufacturer's recommendation for the tires. The tires can be identified through image analysis of the vehicle and the tires. The tire can also be identified from sensor data collected by the tire mat 110 that can be used to analyze a tread pattern.

Figure 3:
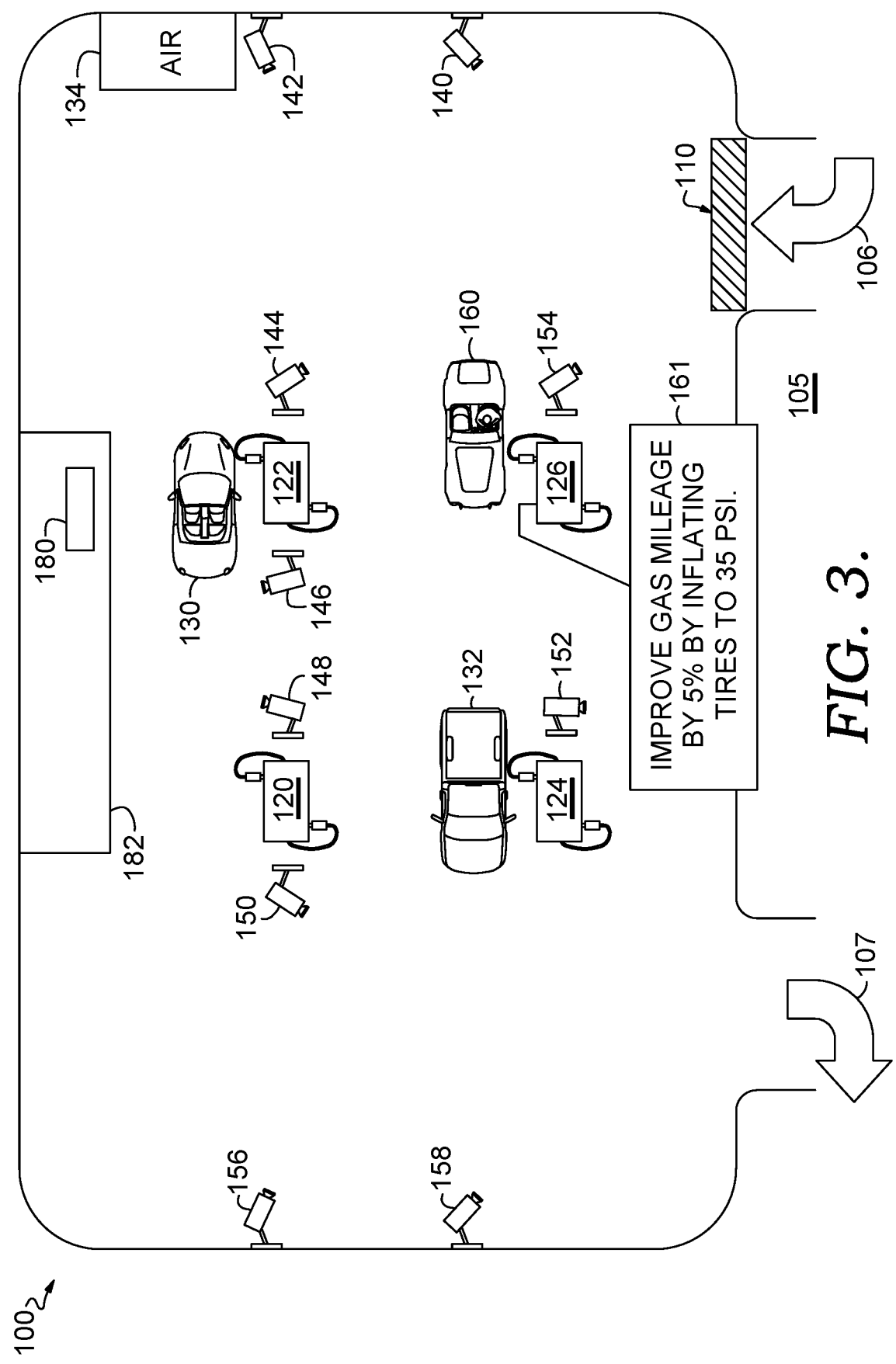
FIG. 3 shows the car receiving a performance alert calculated from tire data captured by the integrated tire monitor.

When one or more characteristics fall outside of the recommended ranges, then an alert can be generated and communicated to the user through one or more platforms, as shown in FIG. 3. From FIG. 2 to FIG. 3, vehicle 160 has moved from the entrance 106 to the pump 126. Upon determining that the tire pressure is low in one or more tires, a smart alert can be provided through the pump 126. The alert to be communicated audibly through a speaker and/or visibly through a monitor associated with the pump 126. The example smart alert 161 states that gas mileage could be improved by 5% if the tires are inflated to 35 psi. This is just one example of a smart alert; other types of smart alerts could be communicated.

The type of smart alert selected can be based on the effectiveness of various types of smart alerts on the specific user in specific contexts. The effectiveness of different types of alerts on different types of users in different types of contexts in general can also be considered. For example, a smart alert based on improving gas mileage may prove most effective in general for the specific user or for a large group of users in a typical context. However, when the weather is bad or bad weather is forecast a smart alert based on improved breaking, traction, or cornering could prove more effective. The effectiveness of a given alert can be measured by the response a user takes to the alert. For example, a user electing to add air to the tire to the smart air station can be counted as a positive response. Other information collected apart from the service station 100 can be used to determine a positive response to an alert. For example, if the next time the vehicle visits the service station 100 with fully inflated tires a positive result can be assigned to the alert. Conversely, if the user does not use the smart air station 134 and continues to be observed with underinflated tires and the alert can be considered ineffective.

In one aspect, tire pressure monitoring systems integrated with the vehicle provides information to the performance optimization system 180 or other computing system that generates smart alerts. The effectiveness of these alerts can be measured by tracking the tire pressure through subsequent readings taken by the pressure monitoring system. In an aspect, some vehicles communicate pressure monitoring data to the performance optimization system.

In addition to tire pressure, the system may be able to monitor car alignment and tread life. In addition to communicating that an alignment or tread life is outside of optimized and/or target ranges, the performance optimization system 180 can automatically make an appointment for new tires or adjusted alignment. After checking vendor availability and a user's calendar (including a shadow calendar) for a time and date that is mutually available, an appointment suggestion could be presented through a user smart phone, the pump, or some other method.

A user's previous maintenance records or actions can be analyzed to suggest a vendor. For example, an appointment could be suggested for the user's typical mechanic.

Figure 4:
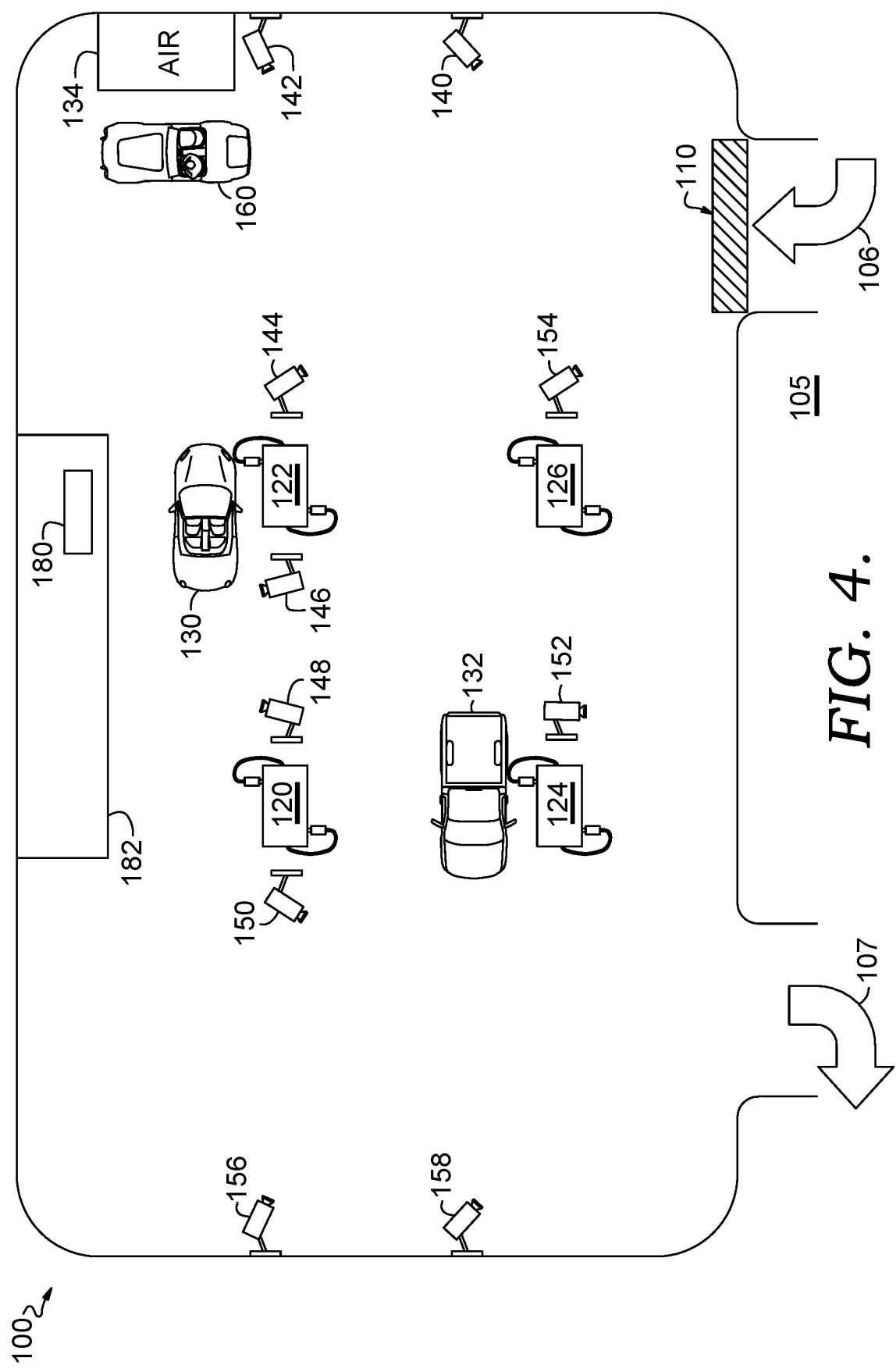
FIG. 4 shows the car at the smart tire inflation system.

Turning now to FIG. 4, the vehicle 160 is elected to add air to one or more tires using the smart air station 134. As mentioned, data captured by the image sensors can be used to track the vehicle 160 as it moves throughout the service station 100 to the smart air station 134. The smart air station can automatically set the correct pressure needed for the particular tires. The user can then simply attach the hose to the spigot and the tire will be filled to the correct pressure without the user needing to take measurements. In one aspect, image analysis of the tires in vehicle is used to identify the recommended pressure.

Figure 5:
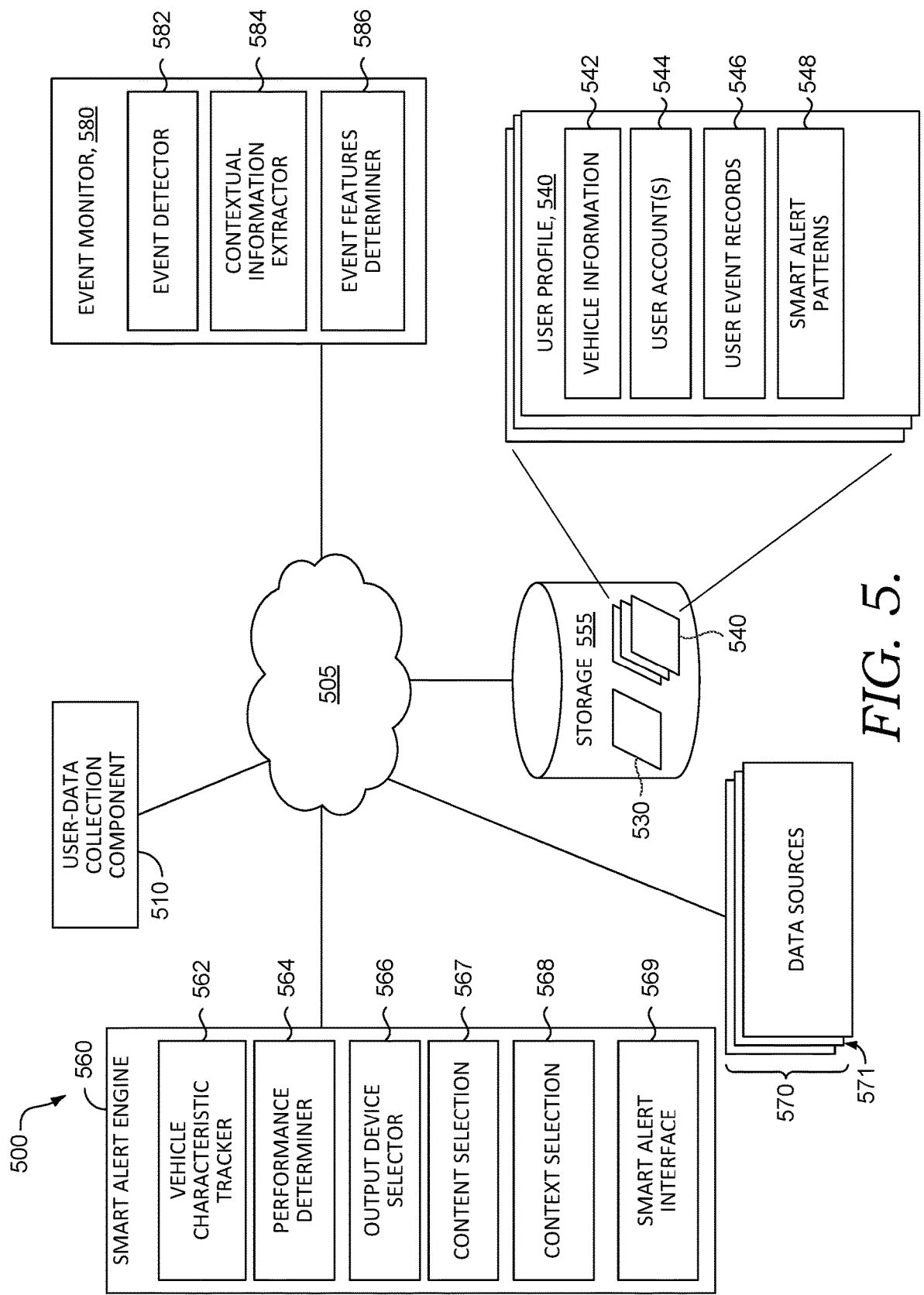
FIG. 5 shows an automobile performance improvement system.

Referring now to FIG. 5, a block diagram is provided showing aspects of an example computing system architecture suitable for implementing an aspect and designated generally as performance enhancement system 500. System 500 represents only one example of a suitable computing system architecture. Other arrangements and elements can be used in addition to or instead of those shown, and some elements may be omitted altogether for the sake of clarity. Many of the elements described herein are functional entities that may be implemented as discrete or distributed components or in conjunction with other components, and in any suitable combination and location.

Example system 500 includes network 505, which communicatively couples components of system 500 including user-data collection component 510, user event monitor 580, smart-alert engine 560, data sources 570, and storage 525. User event monitor 580 (including its components 582, 584, and 586), smart alert engine 560 (including its components 562, 564, 566, 567, and 569), user-data collection component 510, and data sources 570 may be embodied as a set of compiled computer instructions or functions, program modules, hardware sensors, computer software services, or an arrangement of processes carried out on one or more computer systems, such as computing device 900 described in connection to FIG. 9, for example.

A particular data source may be a user device 571. User devices 571 may comprise any type of computing device capable of use by a user. For example, in one aspect, user device 571 may be the type of computing device described in relation to FIG. 9 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, a gas pump, an embedded system controller, a remote control, an appliance, a consumer electronic device, a workstation, or any combination of these delineated devices, or any other suitable device.

In one aspect, the functions performed by components of system 500 are associated with one or more applications, services, or routines. In particular, such applications, services, or routines may operate on one or more user device, servers, may be distributed across one or more user devices and servers, or be implemented in the cloud. Moreover, in some aspects, these components of system 500 may be distributed across a network. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 500, it is contemplated that in some aspects functionality of these components can be shared or distributed across other components.

Continuing with FIG. 5, user-data collection component 510 is generally responsible for accessing or receiving (and in some cases also identifying) user data from one or more data sources 570, such as from a user's vehicle information system (including data from tire pressure monitoring system), a tire mat, a user's smart phone, credit card companies, online vendors, payment vendors, vehicle service providers. The user-data collection component 510 can receive both information that is useful to providing smart alerts and information that is not useful. The useful data can be identified and used to generate event records by the user event monitor 580, as described subsequently. In some aspects, the event records are then processed to generate a smart alert.

In some aspects, user-data collection component 510 may be employed to facilitate the accumulation of user data of a particular user (or in some cases, a plurality of users including crowdsourced data) for user event monitor 580 and/or smart alert engine 560. The data may be received (or accessed), and optionally accumulated, reformatted and/or combined, by user-data collection component 510 and stored in one or more data stores, such as storage 525, where it may be available to other components of system 500. For example, the user data may be stored in or associated with a user profile 540, as described herein. In some aspects, any personally identifying data (i.e., user data that specifically identifies particular users) is either not uploaded or otherwise provided from the one or more data sources with user data, is not permanently stored, and/or is not made available to user event monitor 580 and/or smart alert engine 560. User's may be provided an opt-in or opt-out for various methods of collecting, storing, sharing, and using user data.

User data may be received from a variety of sources where the data may be available in a variety of formats. For example, in some aspects, user data received via user-data collection component 510 may be determined via one or more tire sensors, which may be on or associated with one or more vehicles or devices (such a tire mat or smart air station). As used herein, a sensor may include a function, routine, component, or combination thereof for sensing, detecting, or otherwise obtaining information, such as user data from a data source, and may be embodied as hardware, software, or both. By way of example and not limitation, user data may include data that is sensed or determined from one or more sensors (referred to herein as sensor data), such as tire pressure data, tire tread data, tire alignment data, vehicle characteristic data, vehicle performance data, location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user-data associated with communication events; etc.) including, in some aspects, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, WeChat, Alibaba, video-streaming services, gaming services, or Xbox Live®), user-account(s) data (which may include data from user preferences or settings associated with a personal assistant application or service), home-sensor data, appliance data, global positioning system (GPS) data, vehicle user data, traffic data, weather data (including forecasts), other user device data (which may include device settings, profiles, network-related information (e.g., network name or ID, domain information, work group information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 510 receives or accesses data continuously, periodically, or as needed.

User event monitor 580 is generally responsible for monitoring user data for information that may be used for identifying and defining smart alert events, which may include identifying and/or tracking features (sometimes referred to herein as "variables") or other information regarding specific user actions (including those related to a vehicle maintenance or alert) and related contextual information. In effect, the user event monitor 580 filters relevant information from all other information and stores the relevant information for use generating smart alerts. The relevant information may be stored as a smart alert event record. A smart alert event can be anything related to a vehicle, user, or user activity. An event can be stored in the form of an event record. For example, a smart alert event can be based on receiving a tire pressure reading. The event record can comprise the tire pressure, data/time of the reading, source of the reading, vehicle information at the date/time (e.g., mileage, gas level), identification information for the vehicle, and identification for the user associated with the vehicle. A smart alert event can be used as input to determine the effectiveness of different smart alert content, timing, and presentation component options. The event's occurrence and details can be inferred from the user data. For example, an upward change in tire pressure can be classified as a tire maintenance event at a time the change is observed even though a direct observation of the user filling the tire is not made. In other cases, a similar event could be generated from data received from a smart air station where direct observation of the user filling the tire is possible. Using events, instead of actual data as input, can simplify the process of selecting an optimal smart alert by providing a more uniform input across users.

Aspects of user event monitor 580 may determine, from the monitored user data, when the user and/or vehicle undergoes a maintenance event. In other words, the user event monitor 580 may receive user data and generate event data, such as a tire replacement event. The event data can then be used to generate a smart alert for the user. For example, a tire replacement event that includes a vendor can be used to recommend an appointment with the same vendor the next time a tire needs to be replaced.

An event record can be generated in response to communicating a smart alert. The record can memorialize details of the alert and how the user responded to the alert. The response can be direct or inferred. For example, the user may receive a notification on a smart phone notifying the user that a smart alert has been received. The event record could indicate that the message was then read or not read. Overtime, this type of smart-alert event record can be used to optimize the smart alerts send to a user.

User event monitor 580 may identify current or near-real-time user event information and may identify historical user event information, in some aspects, which may be determined based on gathering observations of user data over time and accessing user logs of past event data.

As shown in example system 500, user event monitor 580 comprises a user event detector 582, contextual information extractor 584, and an event features determiner 586. In some aspects, user event monitor 580 may determine interpretive data from received user data. Interpretive data corresponds to data utilized by these components of system 500 or subcomponents of user event monitor 580 to interpret user data. For example, interpretive data can be used to provide other context to user data, which can support determinations or inferences made by the components or subcomponents.

User event detector 582, in general, is responsible for determining (or identifying) a smart alert event for the user by analyzing user data. The goal is to separate user information related to smart-alert events from all other information. Aspects of user event detector 582 may be used for determining a type of event occurred. Various heuristics can be used to determine that some events occurred. For example, a tire pressure heuristic could evaluate user data to identify when air is added to a tire. Some aspects of user event detector 582 may monitor user data for smart-alert features or variables corresponding to vehicle performance, such as indications of visits to service stations, mechanics, changes in vehicle characteristics, and such.

Additionally, some aspects of user event detector 582 extract from the user data information about user events relevant to previously communicated smart alerts, which may include current user events, historical events, and/or related information such as contextual information contemporaneous with communicating an alert. (Alternatively or in addition, in some aspects, contextual information extractor 584 determines and extracts contextual information that is related to one or more events. Similarly, in some aspects, event features determiner 586 extracts information about events based on an identification of the event determined by user event detector 582.)

Further, the extracted event information may be stored in a user profile associated with the user, such as in energy-level information component 542 of user profile 540. In some aspects, user event detector 582 or user event monitor 580 (or its other subcomponents) performs conflation on the detected user information. For example, overlapping information may be merged and duplicated or redundant information eliminated.

In some aspects, the smart alert features may be interpreted by a machine classification process to determine a smart alert event has occurred. For example, in some aspects, user event detector 582 employs user event logic, which may include rules, conditions, and/or associations, to identify or classify user events. The classifying of events (e.g., maintenance, work, social, vacation, transit) can be based on feature-matching or determining similarity in features, which falls under pattern recognition. This type of classification may use pattern recognition, fuzzy logic, neural network, finite state machine, support vector machine, logistic regression, clustering, or machine learning techniques, similar statistical classification processes, or combinations of these to identify events from user data. For example, exercise logic may specify types of vehicle information that are associated with a smart alert event, such as a tire pressure decreasing a threshold amount over a designated duration (day). This may indicate a leak in a tire.

Contextual information extractor 584, in general, is responsible for determining contextual information related to the events, such as context features or variables associated with an event, related information, and is further responsible for associating the determined contextual information with the detected event. In some aspects, contextual information extractor 584 may associate the determined contextual information with the related event and may also log the contextual information with the associated event. Some aspects of contextual information extractor 584 determine contextual information related to an event such as entities related to the event (e.g., it was raining when the user responded positively to an alert indicating breaking performance had decreased) or the location or venue wherein the event took place. For example, the location from a user's smart phone could be used to determine where the user went to add air to a tire. By way of example and not limitation, this may include context features such as location data, which may be represented as a location stamp associated with the exercise event; contextual information about the location, such as venue information (e.g., this is the user's office location, home location, gym, etc.) time, day, and/or date, which may be represented as a time stamp associated with the event; or duration of the event, other user activities preceding and/or following the event, other information about the event such as entities associated with the event (e.g., venues, people, objects, etc.).

In aspects using contextual information related to user devices, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. In some aspects, a device name or identification (device ID) may be determined for each device associated with a user. This information about the identified user devices associated with a user may be stored in a user profile associated with the user, such as in user account(s) 544 of user profile 540. In an aspect, the user devices may be polled, interrogated, or otherwise analyzed to determine contextual information about the devices. This information may be used for determining a label or identification of the device (e.g., a device ID) so that contextual information about an exercise event captured on one device may be recognized and distinguished from data captured by another user device. In some aspects, users may declare or register a user device, such as by logging into an account via the device, installing an application on the device, connecting to an online service that interrogates the device, or otherwise providing information about the device to an application or service. In some aspects, devices that sign into an account associated with the user, such as a Microsoft® account or Net Passport, email account, social network, or the like, are identified and determined to be associated with the user.

In one aspect, a vehicle or user can be identified at a gas pump by the user presenting a bar code or other identification information to a scanner or image sensor. As mentioned, a vehicle may be identified with a license plate number.

In some implementations, contextual information extractor 584 may receive user data from user-data collection component 510, parse the data, in some instances, and identify and extract context features or variables (which may also be carried out by event features determiner 586). Context variables may be stored as a related set of contextual information associated with the event, and may be stored in a user profile such as in user smart alert information component 542.

Event features determiner 586 is generally responsible for determining smart alert features (or variables) associated with an event that may be used for identifying patterns of user behavior. In some aspects, event features determiner 586 receives information from user event monitor 580 (or its subcomponents), and analyzes the received information to determine a set of zero or more features associated with the event. Common features for different events can be used to help establish a pattern.

Continuing with system 500 of FIG. 5, smart alert engine 560 is generally responsible for generating smart alerts that are optimal for a specific user. In some aspects, smart alert engine 560 may run on a server, as a distributed application across multiple devices, or in the cloud. At a high level, smart alert engine 560 may receive vehicle characteristic information (e.g., smart alert event records), which may be uploaded from smart alert logs from client-side applications or services associated with user event monitor 580, and then generates a smart alert when the characteristic is outside of a target range. One or more inference algorithms may be applied to the smart alert event information to identify correlations between effective smart alerts and characteristics of the alerts that make them effective. Characteristics of an alert can include the content, user context in which the alert is the delivered, and the presentation device that delivers the alert.

As shown, energy-level inference engine 560 comprises vehicle characteristic tracker 562, performance determiner 564, output device selector 566, content selector 567, context selector 568, and smart-alert interface component 569. The energy-level inference engine 560 can process data gathered from data store 555. Vehicle data 530 describes characteristics of different vehicles, performance characteristics of the vehicles, and data used to determine how a change in a vehicle's characteristics affects performance. In addition, the vehicle data 530 can include information about different vehicles and/or vehicle component, such as tires. This data can be used to recognize different types of vehicles and/or tires through image analysis.

The data store 555 can also include a plurality of user profiles, such as profile 540. Profile 540 includes vehicle information 542, user accounts 544, user event records 546, and smart alert patterns 548. The vehicle information can describe one or more vehicles associated with a user. License plate numbers, VIN numbers, and other vehicle identifications can be stored. The vehicle information can also include a maintenance history, mileage, and other data about the vehicle. In an aspect, the event records that relate primarily to a vehicle are included in the vehicle information 542. For example, vehicle characteristics recorded over time may be associated with the vehicle. These characteristics can then be associated with a user, as needed, through the association of the vehicle and the user.

The user account information component 544 can record any known account associated with the user. Account information can include credit card information, email information, social network information, reward program, and such. Email addresses, phone numbers, a home address, work address, and other venues for contacting a user can be stored in the user account information 544. The user account information 554 can also include a record of computing devices associated with the user.

The user event records component 546 the event records generated by the event monitor 580 for the user. The user event records can include a user's response to a smart alert, communication methods and frequency, and other actions taken by the user that are relevant to generating smart alerts.

Vehicle characteristic tracker 562 can evaluate vehicle characteristic data against a series of rules to determine whether a smart alert should be generated. The vehicle characteristic tracker 562 can evaluate raw user data as it is received or evaluate event records. When a rule indicating that a smart alert to be generated is satisfied then the vehicle characteristic tracker 562 can initiate the process of generating a smart alert for a particular user.

As mentioned, vehicle characteristic data, such as tire pressure readings, can be analyzed against a series of rules or heuristics upon receipt. One rule could compare the reading against a target range. For tires, the target range can be a manufacture's recommended pressure. The recommended pressure can be given as a range, for example, 33-35 psi. The target range can also be generated from a static recommendation, such as 33 psi, by taking into account inaccuracy in the sensor reading the pressure. Thus, a static recommendation of 33 psi could be converted to a range of 32.5 to 33.5 or similar.

As described previously, a determination that a vehicle characteristic is outside of a target range can trigger the generation of a smart alert.

Performance determiner 564 determines the change in performance caused by vehicle characteristic. The change in performance may be expressed in a performance alert, which is a type of smart alert. Various vehicle performance characteristics can be impacted by a tire pressure below the target range. In an aspect, a decrease in gas mileage, braking performance, handling performance, or such, could be calculated. As used in this context, decrease in the vehicle performance means the vehicle performs worse than when the tire is within the optimal pressure range. Thus, the braking distance in absolute terms might increase, but this still qualifies as a decrease in a vehicle performance characteristic. The decrease can be an estimate generated using equations that are specific to the vehicle and tire or more generally applicable estimates. The baseline performance characteristic can be retrieved for a table. The decrease in performance may be expressed as a percentage decrease or in absolute terms.

Output device selector 566, selects the optimal device to communicate a smart alert to a user. Smart alerts can be tailored to individual users and user context to increase the probability that a user responds favorably to an alert. A favorable response can be correcting the vehicle characteristic to bring it into the target range. The smart alert can be optimized across multiple vectors. For example, the content of the alert can be optimized, the timing of the alert presentation can be optimized for a user context, and the electronic device used to present the alert can be optimized.

Content selector 567, selects content that is optimal for a user. An initial determination can be whether a performance alert or a comparative alert will be more effective for a particular user. This determination can be made through use of a machine classifier, which looks at patterns of user interactions with smart alerts and determines which types of alerts are most effective for a particular user. When limited data is available for a user, characteristics of a user can be compared to the performance of alerts presented to a crowd of users having similar characteristics. For example, it might be observed that users having an interest in sports respond better to the comparative alerts. Accordingly, a user with a known interest in sports may be presented a comparative alert. As a user's history of interaction with alerts grows, the user preferences can be learned and the alerts tailored to the specific user. Crowd data can always be used as an input to the determination, but typically more weight can be given to interaction data for actual user.

The analysis can take into account multiple factors at the same time. Thus, the effectiveness of a performance alert verse a comparative alert can take into account the vehicle characteristic. It may be found that a user that generally responds better to a comparative alert will not respond to a comparative alert that essentially indicates the user is doing relatively well compared to the group. For example, when tire pressure is only slightly outside of the target range a performance alert may be more effective than a comparison alert. This is just an example to illustrate that individuals may respond differently to different types of alert in different contexts. The best alert for an individual can be determined through analysis of the user's actions and the actions of similar users to find a correlation between a content and effective smart alerts.

In one aspect, comparative alerts are not necessarily provided when a user is a top performer within a group, but can be provided based on when a current vehicle characteristic can be improved or optimized. For example, a particular user may be able to improve gas mileage by 5% but is still a top performer within the group that averages and available 10% improvement. In this circumstance, a performance alert can be communicating explaining the opportunity for a 5% gas mileage improvement.

A smart alert content can be generated using one of a plurality of templates. When a performance alert is being generated, a plurality of different templates may be available for each performance characteristic. For example, a group of templates may be available to communicate a decrease in gas mileage and another group of templates available to communicate a decrease in breaking or handling effectiveness. One template can express a decrease effectiveness by percent another in absolute terms. Accordingly, aspects of the technology can find a correlation between the performance characteristic used for the first content and effective smart alerts communicated to an individual user or group of similar users.

Some templates can be humorous. Some take the form of a serious warning, while others can appear more technical. Different people respond differently to different communication styles. Accordingly, aspects of the technology can find a correlation between the communication style used for the content and effective smart alerts communicated to an individual user or group of similar users.

Smart alerts can be tailored to an individual user as user responses to different alert content or types is measured. It should be noted that a certain number of smart alert opportunities could be designated for experimentation, which involves presenting an alert that is not currently calculated as being the most effective. This allows additional data to be gathered and improved optimization of content and alert type on a user-by-user basis.

Context selector 568 identifies the optimal context for an alert. The user context or timing chosen to present the smart alert can be customized to a user. For example, many users may respond to a smart alert while at a location where remedial action can be taken, such as a service station. In this example, the context is located at a service station. However, other users may better respond when a smart alert is communicated during the morning when he or she is planning his or her day. In this case, the context is a time of day and possibly the location of the user. In this way, the timing or context of a smart alert can be optimized for individual users. The technology described herein identify a user context to present the smart alert but find a correlation within a plurality of effective communications presented to the user or similar users. The communications can be previously presented smart alerts. A communication is effective when a user takes action in response to the communication. For example, the user could schedule maintenance in response to a smart alert.

Smart-alert interface component 569 communicates the smart alert to the electronic device for output to the user. The user does not need to be the driver. For example, the user could be a fleet manager or some other person associated with the car. The user could be the car owner, rather than the driver. For example, a mom could receive an alert indicating her daughter's car is losing air in the right front tire, indicating a leak. The alert could be communicated to multiple users, such as to the mom and the daughter. The person receiving the alert is used as an input to determine the context and electronic device used to receive the alert. For example, a gas pump would not be used to communicate an alert to a person who is not the driver of a vehicle.

The user context or timing chosen to present the smart alert can similarly be customized to users. For example, many users may respond to a smart alert while at a location where remedial action can be taken, such as a service station. However, other users may better respond when a smart alert is communicated during the morning when he or she is planning his or her day. In this way, the timing or context of a smart alert can be optimized for individual users. The technology described herein identify a user context to present the smart alert but find a correlation within a plurality of effective communications presented to the user or similar users.

Figure 6:
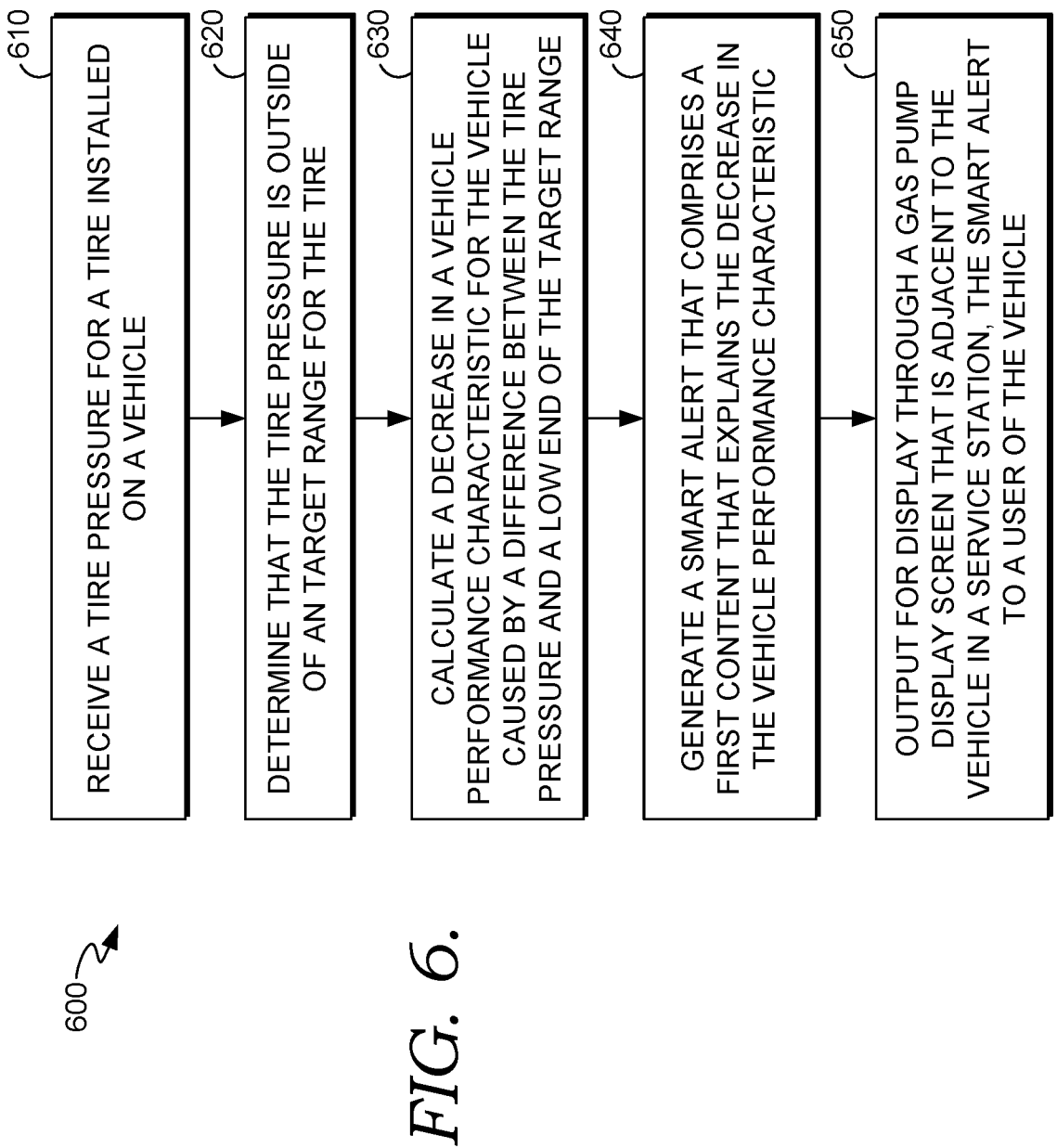
FIGS. 6-8 show flow charts for methods for improving vehicle performance.

Turning now to FIG. 6, a flow chart showing a method 600 for improving vehicle performance is shown, according to an aspect of the technology described herein. Method 600 may be performed, at least in part, at a service station, such as service station 100 described previously.

At step 610, a tire pressure is received for a tire installed on a vehicle. The vehicle may have entered a service station and parked adjacent to a gas pump in a service station. The tire pressure can be initially measured by a sensor, such as a tire mat or onboard tire monitoring system installed in a vehicle. The pressure measurement can be communicated from the sensor to a data collection component, such as data collection component 510, described previously. If the tire pressure reading originates from a tire mat, the tire reading can be communicated to hub located at a service station. The reading could then be passed along from the hub to a server-based performance optimization system that can generate a smart-alert event record. Similarly, an onboard vehicle computer system could communicate the tire pressure to the performance optimization system in a number of ways. For example, the vehicle computer system could communicate via Bluetooth to the user's smart phone. An application on the smart phone could then communicate the reading over a wireless network to a hub located at a service station or to a centralized performance optimization system. The reading could be analyzed according to a series of rules or heuristics to determine whether additional action should be taken.

At step 620, the tire pressure is determined to be outside of a target range for the tire. As mentioned, vehicle characteristic data, such as tire pressure readings, can be analyzed against a series of rules or heuristics upon receipt. One rule could compare the reading against a target range. For tires, the target range can be a manufacture's recommended pressure. The recommended pressure can be given as a range, for example, 33-35 psi. The target range can also be generated from a static recommendation, such as 33 psi, by taking into account inaccuracy in the sensor reading the pressure. Thus, a static recommendation of 33 psi could be converted to a range of 32.5 to 33.5 or similar.

In order to determine the target range for a tire, the tire model or tire class may need to be determined. In one aspect, image analysis of a tire is performed to identify the make and model of the tire and look up the optimal air pressure from a data store. A tire mat may be able to use a tread pattern, tire width, and other characteristics to identify a tire. In another aspect, the make and model of the tire and the optimal air pressure range can already be pre-associated with a user through a user profile. When the tire pressure reading is communicated through a user's smart phone, it is possible to associate the reading with the user and then the user with a vehicle and tire.

As described previously, a determination that a vehicle characteristic is outside of a target range can trigger the generation of a smart alert. Smart alerts can be tailored to individual users and user context to increase the probability that a user responds favorably to an alert. A favorable response can be correcting the vehicle characteristic to bring it into the target range. As part of optimizing the smart alert for a particular user, a determination may be made that a user is most likely to respond positively to an explanation that a vehicle performance characteristic is poorer because of the tire pressure reading. Alternatively, other users may respond to a comparison of their performance to the performance of other drivers in a group.

At step 630, calculating a decrease in a vehicle performance characteristic for the vehicle caused by a difference between the tire pressure and a low end of the target range. Various vehicle performance characteristics can be impacted by a tire pressure below the target range. In an aspect, a decrease in gas mileage, braking performance, handling performance, or such, could be calculated. As used in this context, decrease in the vehicle performance means the vehicle performs worse than when the tire is within the optimal pressure range. Thus, the braking distance in absolute terms might increase, but this still qualifies as a decrease in a vehicle performance characteristic. The decrease can be an estimate generated using equations that are specific to the vehicle and tire or more generally applicable estimates. The baseline performance characteristic can be retrieved for a table. The decrease in performance may be expressed as a percentage decrease or in absolute terms.

At step 640, a smart alert is generated that comprises a first content that explains the decrease in the vehicle performance characteristic. The smart alert can take the form of a text presented in a graphical user interface, an audio alert that may be generated using text to voice technology, a video, or through some other mechanism. The decrease in performance can be phrased in any number of ways. In one example, the decrease in performance is expressed as a percentage drop in performance. For example, braking distance could be described as 5% longer than normal. Similarly, gas mileage could be described as 7% worse than normal.

In another aspect, the decrease is explained in absolute terms. For example, the first content could explain that the user's gas mileage will drop from 30 mpg to 27 mpg because of low tire pressure. As another example, the braking distance from 55 mph could increase from 150 feet 175 feet.

In addition to a first content that explains the decrease in the vehicle performance, a remedy for the vehicle performance could be provided as part of the same smart alert or as part of a supplemental smart alert. For example, a user can be offered the service of a nearby smart air pump to inflate tires or a mechanic to fix or replace a tire that shows symptoms of a leak. Exemplary symptoms of a leak include losing above a threshold air pressure over time.

At step 650, the smart alert is output for display to a user of the vehicle through a display screen in the gas pump. The vehicle is located adjacent to the gas pump. The smart alert may be accompanied by a beep or other audible alert to draw the user's attention to the smart alert on the screen. In order to identify the correct pump, image analysis can be used to identify a vehicle at a particular pump. The user does not need to be the driver. For example, the user could be a fleet manager or some other person associated with the car. The user could be the car owner, rather than the driver. For example, a mom could receive an alert indicating her daughter's car is losing air in the right front tire, indicating a leak.

Figure 7:
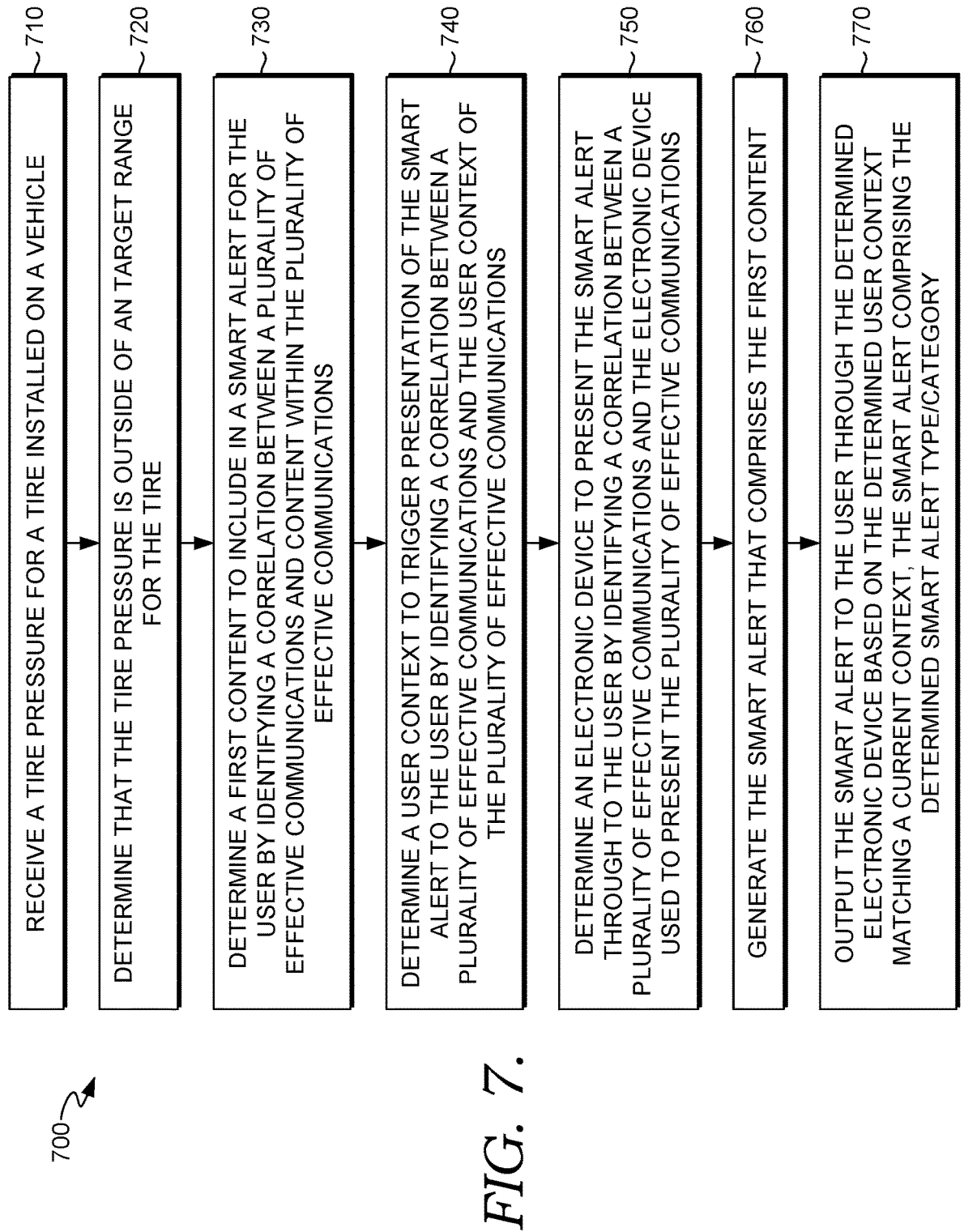

Turning now to FIG. 7, a flow chart showing a method 700 for improving vehicle performance is shown, according to an aspect of the technology described herein. Method 700 may be performed, at least in part, at a service station, such as service station 100 described previously.

At step 710, a tire pressure is received for a tire installed on a vehicle. As described previously, the tire pressure can be initially measured by a sensor, such as a tire mat or onboard tire monitoring system. The pressure measurement can be communicated from the sensor to a data collection component, such as data collection component 510, described previously. The communication process can be direct or pass through one or more intervening devices.

At step 720, the tire pressure is determined to be outside of a target range for the tire. As mentioned, vehicle characteristic data, such as tire pressure readings, can be analyzed against a series of rules or heuristics upon receipt. One rule could compare the reading against a target range. For tires, the target range can be a manufacture's recommended pressure. The recommended pressure can be given as a range, for example, 33-35 psi. The target range can also be generated from a static recommendation, such as 33 psi, by taking into account inaccuracy in the sensor reading the pressure. Thus, a static recommendation of 33 psi could be converted to a range of 32.5 to 33.5 or similar.

As described previously, a determination that a vehicle characteristic is outside of a target range can trigger the generation of a smart alert. Smart alerts can be tailored to individual users and user context to increase the probability that a user responds favorably to an alert. A favorable response can be correcting the vehicle characteristic to bring it into the target range. The smart alert can be optimized across multiple vectors. For example, the content of the alert can be optimize, the timing of the alert presentation can be optimized for a user context, and the electronic device used to present the alert can be optimized.

At step 730, a first content to include in a smart alert for a user of the vehicle is determined by identifying a correlation between a plurality of effective communications and content within the plurality of effective communications. A smart alert can take the form of a performance alert or a comparative alert. A performance alert includes content that explains how a currently measured vehicle characteristic decreases a vehicle's performance. For example, a performance alert could communicate that a car's current tire pressure will reduce the car's gas mileage by five percent compared to when the tires are inflated to the manufacturer's recommended pressure. An alert that only communicates a measured vehicle characteristic without also communicating how the vehicle characteristic influences of vehicle performance is not a performance alert for purposes of the present application.

A comparative alert includes content that compares a characteristic of a vehicle to the characteristic of another group of vehicles. In one aspect, the group of vehicles are those of people having relationships within a social network.

People could opt in to a comparative program that allows vehicle information to be aggregated and used to form the comparative alerts. Other methods of forming a group are possible. As part of a green incentive program, companies could encourage employees to form a group that shares vehicle information with the goal of optimizing vehicle performance. For example, a company with a fleet of vehicles could encourage employees to maintain tire pressure and other characteristics by comparing their vehicle's condition to the condition of other vehicles in the fleet. The goal is to incentivize drivers to keep their vehicles in optimal driving condition to reduce gas usage and decrease the possibility of accidents that could result from non-optimal breaking or handling. Similarly, families could opt into a program that allows vehicle information to be shared and used to generate comparative alerts. An exemplary comparative alert could state that a user is in the bottom 10% of group members in terms of achieving optimal gas mileage through correct tire pressure.

Accordingly, an initial determination can be whether a performance alert or a comparative alert will be more effective for a particular user. This determination can be made through use of a machine classifier, which looks at patterns of user interactions with smart alerts and determines which types of alerts are most effective for a particular user. When limited data is available for a user, characteristics of a user can be compared to the performance of alerts presented to a crowd of users having similar characteristics. For example, it might be observed that users having an interest in sports respond better to the comparative alerts. Accordingly, a user with a known interest in sports may be presented a comparative alert. As a user's history of interaction with alerts grows, the user preferences can be learned and the alerts tailored to the specific user. Crowd data can always be used as an input to the determination, but typically more weight can be given to interaction data for actual user.

The analysis can take into account multiple factors at the same time. Thus, the effectiveness of a performance alert verse a comparative alert can take into account the vehicle characteristic. It may be found that a user that generally responds better to a comparative alert will not respond to a comparative alert that essentially indicates the user is doing relatively well compared to the group. For example, when tire pressure is only slightly outside of the target range a performance alert may be more effective than a comparison alert. This is just an example to illustrate that individuals may respond differently to different types of alert in different contexts. The best alert for an individual can be determined through analysis of the user's actions and the actions of similar users to find a correlation between a content and effective smart alerts.

In one aspect, comparative alerts are not provided when a user is a top performer within a group, but a current vehicle characteristic can be optimized. For example, a particular user may be able to improve gas mileage by 5% but is still a top performer within the group that averages and available 10% improvement. In this circumstance, a performance alert can be communicating explaining the opportunity for a 5% gas mileage improvement.

A smart alert content can be generated using one of a plurality of templates. When a performance alert is being generated, a plurality of different templates may be available for each performance characteristic. For example, a group of templates may be available to communicate a decrease in gas mileage and another group of templates available to communicate a decrease in breaking or handling effectiveness. One template can express a decrease effectiveness by percent another in absolute terms. Accordingly, aspects of the technology can find a correlation between the performance characteristic used for the first content and effective smart alerts communicated to an individual user or group of similar users.

Some templates can be humorous. Some take the form of a serious warning, while others can appear more technical. Different people respond differently to different communication styles. Accordingly, aspects of the technology can find a correlation between the communication style used for the content and effective smart alerts communicated to an individual user or group of similar users.

Smart alerts can be tailored to an individual user as user responses to different alert content or types is measured. It should be noted that a certain number of smart alert opportunities could be designated for experimentation, which involves presenting an alert that is not currently calculated as being the most effective. This allows additional data to be gathered and improved optimization of content and alert type on a user-by-user basis.

At step 740, a user context to trigger presentation of the smart alert to the user is determined by identifying a correlation between the plurality of effective communications and the user context of the plurality of effective communications. The user context or timing chosen to present the smart alert can similarly be customized to users. For example, many users may respond to a smart alert while at a location where remedial action can be taken, such as a service station. However, other users may better respond when a smart alert is communicated during the morning when he or she is planning his or her day. In this way, the timing or context of a smart alert can be optimized for individual users. The technology described herein identify a user context to present the smart alert but find a correlation within a plurality of effective communications presented to the user or similar users.

At step 750, an electronic device to present the smart alert through to the user is determined by identifying a correlation between the plurality of effective communications and the electronic device used to present the plurality of effective communications. For example, a gas pump may be the best way to communicate a smart alert to the general population, but some users may respond better to a message communicated through a vehicle communication system or a smart phone.

At step 760, the smart alert that comprises the first content is generated. Generating the smart alert may include adding a performance characteristic, vehicle characteristic, or other data into the selected template. Once generated, the smart alert can be communicated to a device for either immediate communication to a user or communication upon satisfaction that the selected user context is satisfied. In another aspect, the smart alert is only communicated to the output device upon determination that the context is satisfied.

At step 770, the smart alert is output to the user through the determined electronic device based on the determined user context matching a current context, the smart alert comprising the determined smart alert type/category. The user does not need to be the driver. For example, the user could be a fleet manager or some other person associated with the car. The user could be the car owner, rather than the driver. For example, a mom could receive an alert indicating her daughter's car is losing air in the right front tire, indicating a leak.

Figure 8:
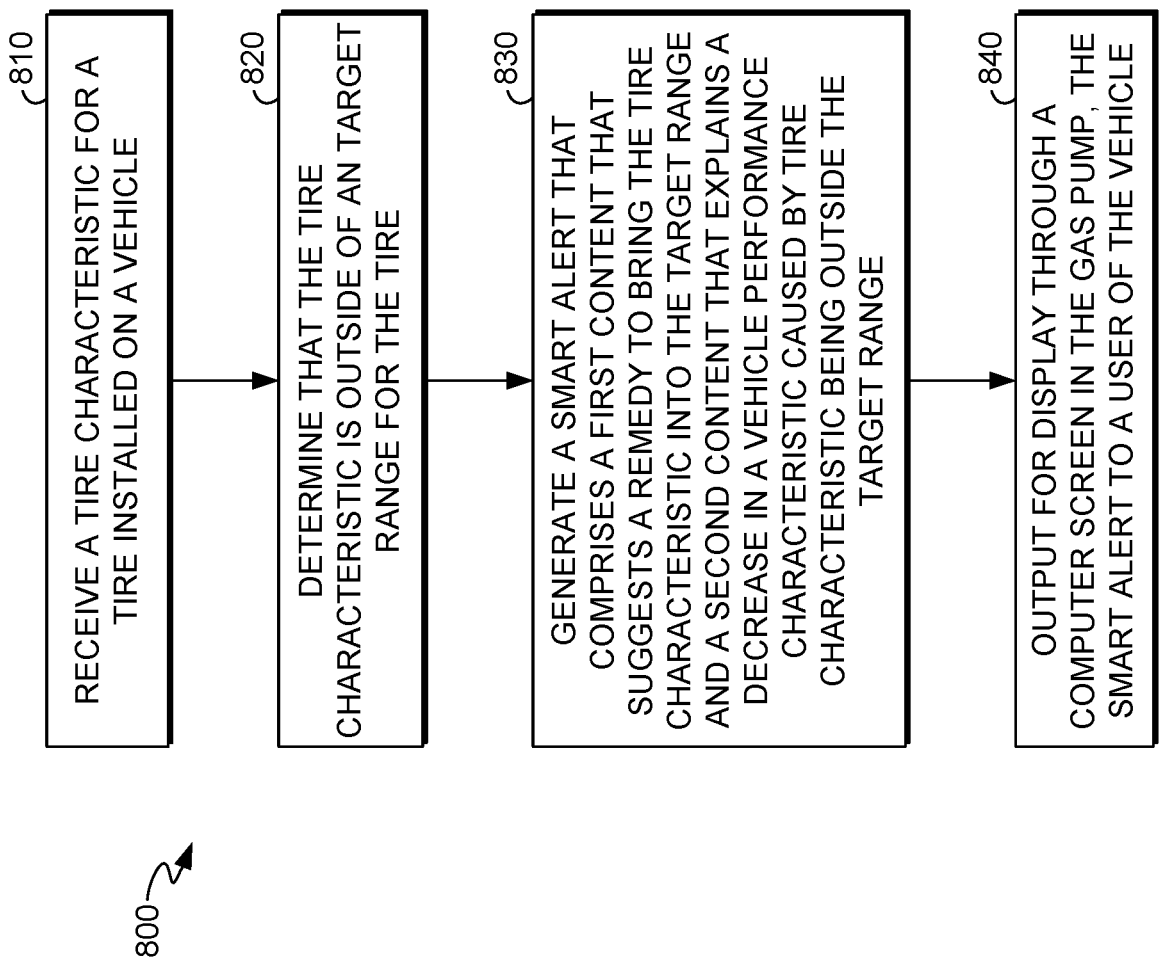

Turning now to FIG. 8, a flow chart showing a method 800 for improving vehicle performance is shown, according to an aspect of the technology described herein. Method 800 may be performed, at least in part, at a service station, such as service station 100 described previously.

At step 810, a tire characteristic is received for a tire installed on a vehicle. The pressure measurement can be communicated from the sensor to a data collection component, such as data collection component 510, described previously. The communication process can be direct or pass through one or more intervening devices.

At step 820, the tire characteristic is determined to be outside of a target range for the tire. As mentioned, vehicle characteristic data, such as tire pressure readings, can be analyzed against a series of rules or heuristics upon receipt. One rule could compare the reading against a target range. For tires, the target range can be a manufacture's recommended pressure. The recommended pressure can be given as a range, for example, 33-35 psi. The target range can also be generated from a static recommendation, such as 33 psi, by taking into account inaccuracy in the sensor reading the pressure. Thus, a static recommendation of 33 psi could be converted to a range of 32.5 to 33.5 or similar.

At step 830, a smart alert is generated that comprises a first content that suggests a remedy to bring the tire characteristic into the target range and a second content that explains a decrease in a vehicle performance characteristic caused by the tire characteristic being outside the target range. The remedy suggested can depend on the characteristic. For example, a tire station can be suggested to remedy low tire pressure. A mechanic can be suggested to replace a tire or fix an alignment problem. The mechanic can be selected for recommendation based on a user's history of interactions with mechanics. If a user does not demonstrate loyalty to a particular mechanic, then a mechanic could be suggested based on price or convenience. Alternatively, the user could be offered an appointment at their regular mechanic when a regular mechanic can be identified from the data.

At step 840, the smart alert is output for display through a computer screen in a gas pump to a user of the vehicle. The vehicle can be located adjacent to the gas pump. The smart alert may be accompanied by a beep or other audible alert to draw the user's attention to the smart alert on the screen. In order to identify the correct pump, image analysis can be used to identify a vehicle at a particular pump. The user does not need to be the driver. For example, the user could be a fleet manager or some other person associated with the car. The user could be the car owner, rather than the driver. For example, a mom could receive an alert indicating her daughter's car is losing air in the right front tire, indicating a leak.

The implementations described previously can interface with a fleet management controller. A fleet is a group of related vehicles. The fleet relationship can be established through common ownership of vehicles, contractual relationships, social network groups, rewards programs, and such. Common ownership can include a few cars owned by a single family or a large group of cars owned by a company. Contractual relationships can include the relationship between a manufacture and one or more logistics or delivery companies that have vehicles that delivery supplies and transport finished goods to market. In this implementation, a manufacture may wish to incentivize fuel efficiency in vehicles operated by its business partners and can use a fleet management controller to monitor its business partner's efforts to keep vehicles running efficiently. Gas station operators can offer rewards programs that provide an incentive to buy gas, services, supplies, food, and other items at a gas station chain. For example, users may receive a discount based on a percentage of past purchases. The rewards program could provide additional discounts based on responding to notifications or keeping a car's tires within a pressure range associated with the manufacturer's suggested tire pressure.

Example fleets can include rental cards, company cars, family cars, delivery vehicles, and such. In a basic implementation, the fleet management controller can receive tire characteristic data, a copy of notifications communicated to drivers, and driver responses (or lack thereof) to the notifications. In one aspect, the fleet management controller can send out additional notifications to drivers, driver's managers, and other interested parties. In the case of a rewards program, the fleet management controller could calculate a reward due to drivers for meeting certain criteria.

Exemplary Operating Environment

Figure 9:
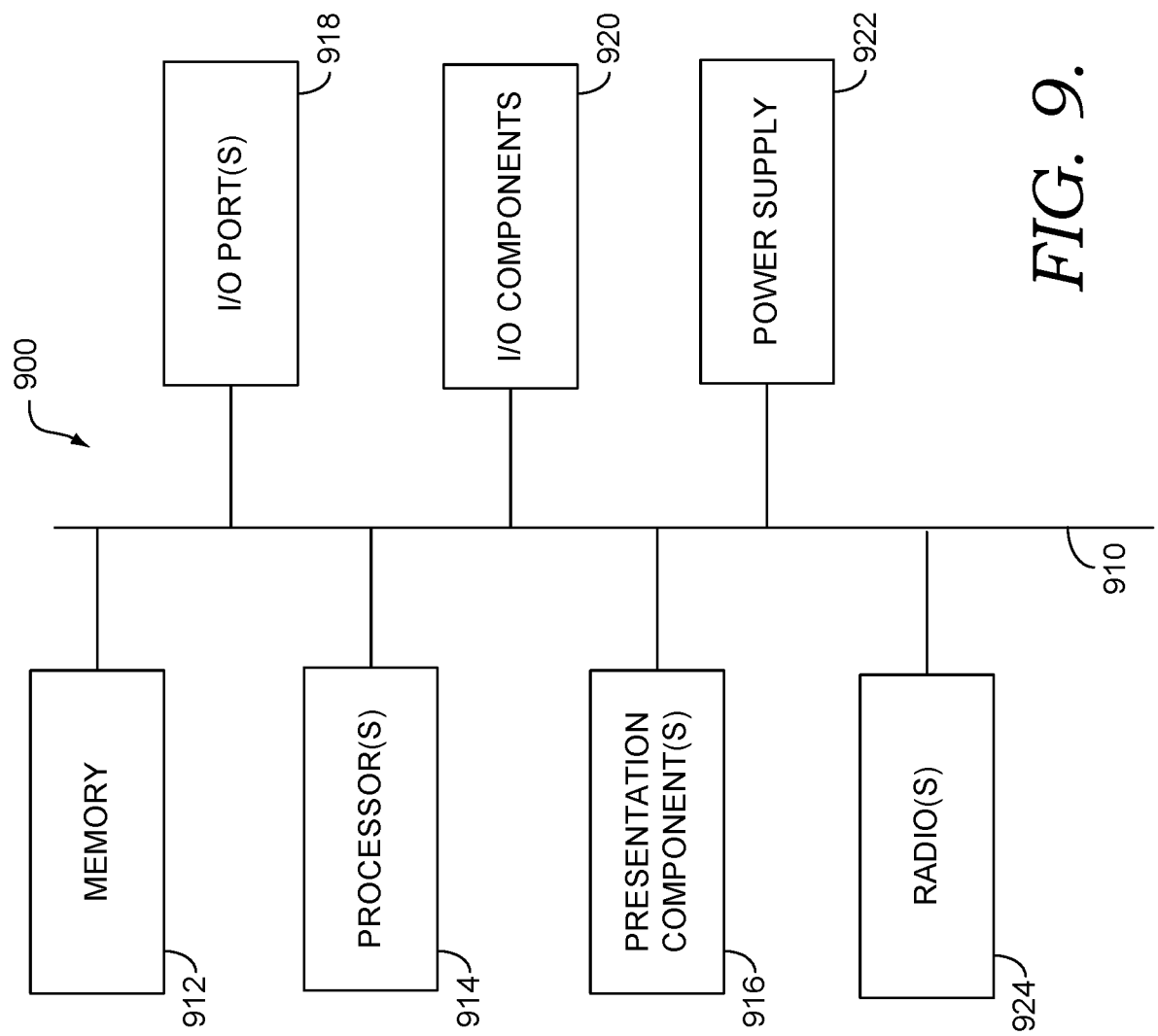
FIG. 9 shows a computing system environment suitable for use with aspects of the technology described herein.

Referring to the drawings in general, and initially to FIG. 9 in particular, an exemplary operating environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, and an illustrative power supply 922. Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, vibrating component, etc. I/O ports 918 allow computing device 900 to be logically coupled to other devices, including I/O components 920, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 900. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with camera systems 926. The camera system 926 can include depth cameras, such as stereoscopic camera systems, infrared camera systems, RGB camera systems, structured light camera systems, TOF camera systems, and combinations of these, for generating depth images. The depth images can be used in gesture detection and recognition, displayed to a user, or used to generate augmented reality, virtual reality, or other imagery. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include a radio 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Additional Embodiments

Embodiment 1. A method for improving vehicle performance, comprising: receiving a tire pressure for a tire installed on a vehicle; determining that the tire pressure is outside of a target range for the tire; calculating a decrease in a vehicle performance characteristic for the vehicle caused by a difference between the tire pressure and a low end of the target range; generating a smart alert that comprises a first content that explains the decrease in the vehicle performance characteristic; and outputting for display through a gas pump display screen that is adjacent to the vehicle in a service station, the smart alert to a user of the vehicle.

Embodiment 2. The method of embodiment 1, wherein the tire pressure is measured by a tire mat installed in the service station.

Embodiment 3. The method of embodiment 1, wherein the tire pressure is measured by a tire pressure monitoring system in the vehicle.

Embodiment 4. The method of any of embodiments 1-3, wherein the vehicle performance characteristic is selected from a group consisting of gas mileage, braking distance, and handling performance.

Embodiment 5. The method of any of embodiments 1-4, further comprising: outputting for display through the gas pump display screen, an offer to use a smart air station located at the service station; receiving a request through the gas pump from the user to use the smart air station; and communicating an instruction to the smart air station with instructions that the vehicle has permission to use the smart air station.

Embodiment 6. The method of embodiment 5 further comprising: receiving images of the service station from one or more image sensors; performing object recognition on the images to track a movement of the vehicle from the gas pump to the smart air station; and upon the vehicle stopping adjacent to the smart air station, setting a parameter on the smart air station to increase the tire pressure to the target range.

Embodiment 7. The method of any of embodiments 1-6, wherein the smart alert includes a second content comprising the tire pressure and an optimal tire pressure.

Embodiment 8. A method for improving vehicle performance, comprising: receiving a tire pressure for a tire installed on a vehicle; determining that the tire pressure is outside of a target range for the tire; determining a first content to include in a smart alert for a user of the vehicle by identifying a correlation between a plurality of effective communications and content within the plurality of effective communications; determining a user context to trigger presentation of the smart alert to the user by identifying a correlation between the plurality of effective communications and the user context of the plurality of effective communications; determining an electronic device to present the smart alert through to the user by identifying a correlation between the plurality of effective communications and the electronic device used to present the plurality of effective communications; generating the smart alert that comprises the first content; and outputting the smart alert to the user through the determined electronic device based on the determined user context matching a current context, the smart alert comprising the determined smart alert type/category.

Embodiment 9. The method of embodiment 8, wherein the first content explains a decrease in a vehicle performance characteristic caused by the tire pressure to the user.

Embodiment 10. The method of embodiment 8, wherein the first content compares a vehicle performance characteristic to the same vehicle performance characteristic in vehicles associated with a group of users.

Embodiment 11. The method of embodiment 10, wherein the group of users is a subset of users in a user's social network.

Embodiment 12. The method of any of embodiments 8-11, wherein the user context is the vehicle being within a geographic proximity of an air station.

Embodiment 13. The method of any of embodiments 8-12, wherein the plurality of effective communications are from a group of smart alerts previously communicated to the user.

Embodiment 14. The method of any of embodiments 8-12, wherein the plurality of effective communications are from a group of smart alerts previously communicated a group of users sharing a demographic characteristic with the user.

Embodiment 15. The method of any of embodiments 8-14, wherein the electronic device is not integrated with the vehicle.

Embodiment 16. A method for improving vehicle performance comprising: receiving a tire characteristic for a tire installed on a vehicle; determining that the tire characteristic is outside of a target range for the tire; generating a smart alert that comprises a first content that suggests a remedy to bring the tire characteristic into the target range and a second content that explains a decrease in a vehicle performance characteristic caused by the tire characteristic being outside the target range; and outputting for display through a display screen in a gas pump, the smart alert to a user of the vehicle.

Embodiment 17. The method of embodiment 16, wherein the tire characteristic is a tread depth measured by a tire mat installed at the service station and the remedy is an offer to make an appointment for tire replacement at a vendor the user has visited previously.

Embodiment 18. The method of embodiment 16, wherein the tire characteristic is a tire alignment measured by a tire mat installed at the service station and the remedy is an offer to make an appointment for tire alignment at a vendor the user has visited previously.

Embodiment 19. The method of any of embodiments 16-18, further comprising associating the vehicle with a user account through image recognition.

Embodiment 20. The method of embodiment 19, wherein the image recognition identifies a license plate on the vehicle and uses information from the license plate to identify the user.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for improving vehicle performance, comprising:
   receiving a tire pressure for a tire installed on a vehicle;
   determining that the tire pressure is outside of a target range for the tire;
   calculating a decrease in a vehicle performance characteristic for the vehicle caused by a difference between the tire pressure and a low end of the target range;
   generating a smart alert that comprises a first content that explains the decrease in the vehicle performance characteristic; and
   outputting for display through a gas pump display screen that is adjacent to the vehicle in a service station, the smart alert to a user of the vehicle.

2. The method of claim 1, wherein the tire pressure is measured by a tire mat installed in the service station.

3. The method of claim 1, wherein the tire pressure is measured by a tire pressure monitoring system in the vehicle.

4. The method of claim 1, wherein the vehicle performance characteristic is selected from a group consisting of gas mileage, braking distance, and handling performance.

5. The method of claim 1, further comprising: outputting for display through the gas pump display screen, an offer to use a smart air station located at the service station; receiving a request through the gas pump from the user to use the smart air station; and communicating an instruction to the smart air station with instructions that the vehicle has permission to use the smart air station.

6. The method of claim 5 further comprising:
   receiving images of the service station from one or more image sensors;
   performing object recognition on the images to track a movement of the vehicle from the gas pump to the smart air station; and
   upon the vehicle stopping adjacent to the smart air station, setting a parameter on the smart air station to increase the tire pressure to the target range.

7. The method of claim 1, wherein the smart alert includes a second content comprising the tire pressure and an optimal tire pressure.

8. A method for improving vehicle performance, comprising:
   receiving a tire pressure for a tire installed on a vehicle;
   determining that the tire pressure is outside of a target range for the tire;
   determining a first content to include in a smart alert for a user of the vehicle by identifying a correlation between a plurality of effective communications and content within the plurality of effective communications;
   determining a user context to trigger presentation of the smart alert to the user by identifying a correlation between the plurality of effective communications and the user context of the plurality of effective communications;
   determining an electronic device to present the smart alert through to the user by identifying a correlation between the plurality of effective communications and the electronic device used to present the plurality of effective communications;
   generating the smart alert that comprises the first content; and
   outputting the smart alert to the user through the determined electronic device based on the determined user context matching a current context, the smart alert comprising the determined smart alert type/category.

9. The method of claim 8, wherein the first content explains a decrease in a vehicle performance characteristic caused by the tire pressure to the user.

10. The method of claim 8, wherein the first content compares a vehicle performance characteristic to the same vehicle performance characteristic in vehicles associated with a group of users.

11. The method of claim 10, wherein the group of users is a subset of users in a user's social network.

12. The method of claim 8, wherein the user context is the vehicle being within a geographic proximity of an air station.

13. The method of claim 8, wherein the plurality of effective communications are from a group of smart alerts previously communicated to the user.

14. The method of claim 8, wherein the plurality of effective communications are from a group of smart alerts previously communicated a group of users sharing a demographic characteristic with the user.

15. The method of claim 8, wherein the electronic device is not integrated with the vehicle.

16. A method for improving vehicle performance comprising:
   receiving a tire characteristic for a tire installed on a vehicle;
   determining that the tire characteristic is outside of a target range for the tire;
   generating a smart alert that comprises a first content that suggests a remedy to bring the tire characteristic into the target range and a second content that explains a decrease in a vehicle performance characteristic caused by the tire characteristic being outside the target range; and
   outputting for display through a display screen in a gas pump, the smart alert to a user of the vehicle.

17. The method of claim 16, wherein the tire characteristic is a tread depth measured by a tire mat installed at the service station and the remedy is an offer to make an appointment for tire replacement at a vendor the user has visited previously.

18. The method of claim 16, wherein the tire characteristic is a tire alignment measured by a tire mat installed at the service station and the remedy is an offer to make an appointment for tire alignment at a vendor the user has visited previously.

19. The method of claim 16, further comprising associating the vehicle with a user account through image recognition.

20. The method of claim 19, wherein the image recognition identifies a license plate on the vehicle and uses information from the license plate to identify the user.

* * * * *